C. WOLF.
LOCK.
APPLICATION FILED OCT. 14, 1916.
1,344,469.
Patented June 22, 1920.
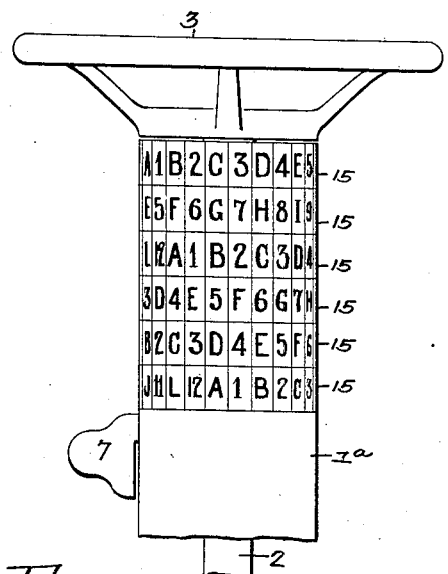
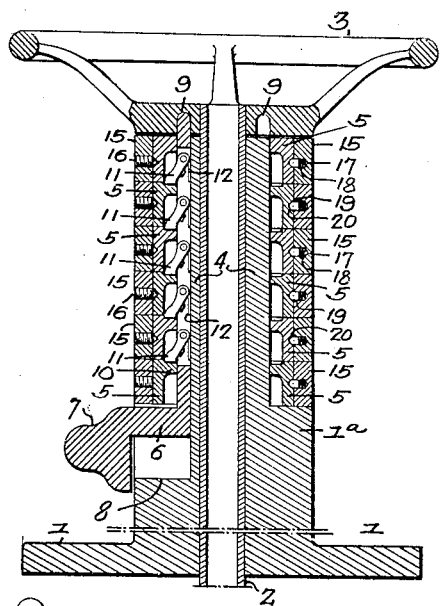
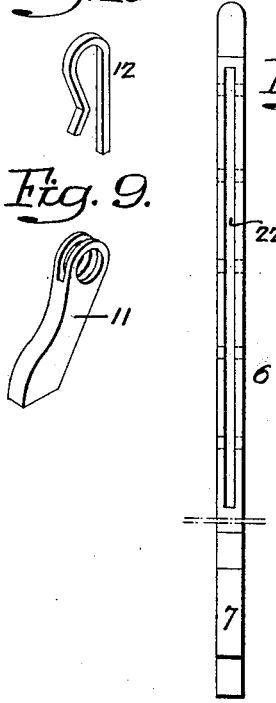
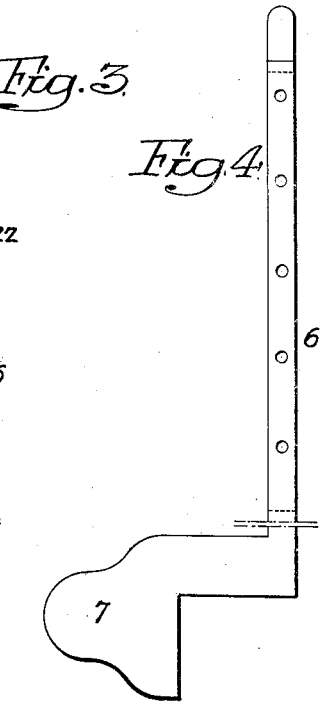
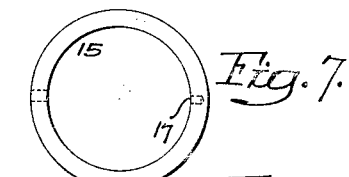
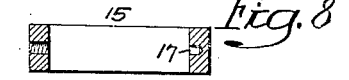
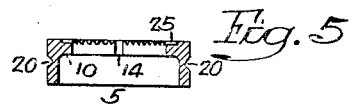
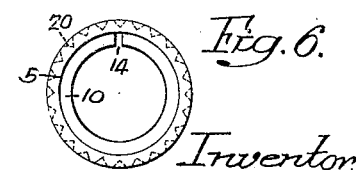
Inventor.
Charles Wolf.
by his Attorneys.
Howson & Howson

UNITED STATES PATENT OFFICE.

CHARLES WOLF, OF PHILADELPHIA, PENNSYLVANIA.

LOCK.

1,344,469.  Specification of Letters Patent.  Patented June 22, 1920.

Application filed October 14, 1916. Serial No. 125,615.

*To all whom it may concern:*

Be it known that I, CHARLES WOLF, a citizen of the United States, residing in Philadelphia, Pennsylvania, have invented Locks, of which the following is a specification.

One object of my invention is to provide a relatively simple, substantial and reliable combination locking device particularly adapted to hold a rotary member from turning until all of a number of controlling members have been brought into predetermined positions; the construction being especially designed for application to the steering post of a motor vehicle, to prevent the unauthorized operation thereof.

Another object of the invention is to provide a combination lock having its parts so positioned that its locking bolt tends to remain in its released position under the action of gravity although retained in its locking position by spring pawls or dogs;—the arrangement of parts being such that while said bolt may at any time be moved into its locking position regardless of the positions of the other parts, it can be moved to a releasing position only when said parts all occupy definite predetermined positions.

It is further desired to provide relatively simple means for conveniently and quickly altering the combination of the lock while retaining the locking rings in unaltered relative positions.

These objects and other advantageous ends I attain as hereinafter set forth, reference being had to the accompanying drawings, in which, Figure 1 is a side elevation of a motor vehicle steering post showing my invention as applied thereto;

Fig. 2 is a longitudinal section of the device shown in Fig. 1;

Figs. 3 and 4 are respectively a front and a side elevation of the locking bolt forming part of my invention;

Figs. 5 and 6 are respectively a vertical section and a plan of one of the locking rings;

Figs. 7 and 8 are respectively a plan and a vertical section of one of the combination rings; and Figs. 9 and 10 are perspective views of one of the pawls and one of the pawl springs respectively.

In the above drawings 1 represents the fixed structure for supporting the steering post 2 and this has cylindrical extensions $1^a$ and 4 which project upward concentrically with said post. On the upper end of the steering post is non-removably fixed the steering wheel 3 and between this and the shoulder between the parts 4 and $1^a$ is a series of locking rings 5 rotatably mounted on said part 4. This latter as well as the part $1^a$ of the fixed structure is longitudinally slotted for the reception of a longitudinally slidable locking bolt 6 which has an operating arm or handle 7 projecting at right angles to its length and operative in an enlarged portion 8 of the slot in the fixed part $1^a$.

It is noted that the locking bolt preferably extends upwardly toward the steering wheel 3 which has one or a series of holes 9 formed in the under face of its hub for the reception of the upper end of said bolt so that the wheel 3 and therefore the post connected thereto may be immovably held in any one of a number of positions. While the bolt may be made in any of a number of forms, it is preferably formed with a longitudinally extending slot 22 in which are pivotally mounted a series of pawls or dogs 11 at all times forced outwardly by springs 12.

As shown in Figs. 5 and 6, each of the locking rings has an inwardly extending flange 10 which alone has bearing on the cylindrical fixed part 4, so that each of said rings has an annular recess surrounding said part, into which one of the locking pawls 11 may project when the bolt 6 which carries it occupies its locking position. There is thus a locking pawl for each locking ring except that next the fixed part $1^a$ and these pawls are so mounted that they will all be simultaneously projected into the annular recesses of said rings when the bolt 6 has been moved upwardly into the recess 9 into position to lock the steering wheel.

Each of the locking rings 5 has in its flange a narrow opening 14 sufficiently wide to permit passage of one of the pawls 11 and as above noted there is on the bolt 6 a pawl for each of said locking rings except the lowest one of the series, which merely has an opening 14 of sufficient width to pass the pawl 11 of the next higher ring when the bolt moves longitudinally after said pawl and opening have been brought into line.

Each of the locking rings 5 has rotatably mounted upon it a combination ring 15 of the same width, and in the case illustrated, there are six locking rings with six combination rings mounted in the space between the steering wheel 3 and the shoulder formed on the part 1ª of the fixed structure. Each combination ring is held to its corresponding locking ring so as to ordinarily insure its movement, by a set screw 16, and at any suitable point each combination ring has extending into it from its inner surface a recess 17 in which is mounted a spring 18 at all times pressing inwardly a ball 19 so that it enters or tends to enter any one of a series of shallow depressions 20 in the external cylindrical surface of the locking ring 5. These notches or recesses 20 are placed at predetermined and preferably uniform distances apart and the arrangement is such that when any of the holding screws 16 is slacked off, the corresponding spring-pressed pawl 19 none the less holds together the coöperating locking and combination rings so that the turning of the latter necessarily turns the former.

If, however, the locking rings are held from turning, then a forcible rotation of the combination ring moves the pawl 19 into its recess 17 against the action of the spring and permits an adjustment of the relative positions of said rings. Each of the combination rings has on its outer surface a series of numbers, letters or other symbols such as is shown in Fig. 1, and there are the same number of symbols on each ring, so that it is possible by turning the various rings to bring any desired succession or combinations of said symbols into a line parallel to the line of the steering post 2.

Under conditions of use when it is desired to lock the steering wheel 3 from unauthorized operation, the handle 7 of the locking bolt is moved longitudinally of the steering post so that its upper end enters one of the holes 9 in the hub of the steering wheel. When said bolt occupies this locking position, all of the pawls 11 project outwardly under the action of their springs so that their free ends extend respectively within the hollow or annular recesses of the locking rings. The reverse movement of the bolt 6 is effectually prevented, since the free end of each of the pawls rests upon the flange 10 of the locking ring next below it. Even if the opening 14 of one or several of the rings should happen to lie in line with the coöperating pawl or pawls, the releasing movement of the bolt 6 would be impossible until all of said pawls were so positioned.

In order to release the bolt from locking engagement with the steering wheel, it is necessary that the various combination rings 15 be rotated until the predetermined succession of symbols lie in the same straight line, at which time all of the openings 14 in the locking rings are in line with the pawls of the adjacent rings, and a downward movement of the bolt 6 sufficient to free its upper end from the hole 9 of the steering wheel is possible. Obviously with such an arrangement of parts it is a practical impossibility for a person, not knowing the combination of the device, to release the steering wheel from the bolt 6 and hence from the fixed structure to which said bolt connects it.

If it be desired to alter the combination of the lock, this may be conveniently accomplished by slacking off the set screw 16 of one or any desired number of the combination rings and forcibly turning the corresponding locking ring against the action of its spring-pressed ball 19, while said ring is held by its pawl. For this purpose the bolt is moved to a position in which its pawls lie in the notches or openings 14 and after each adjustment the ball serves to retain each pair of the coöperating rings in their given positions until the connecting screw is again set up.

In order to prevent or render difficult the release of the locking bolt by experimental operation of the locking rings, the upper faces of their flanges are provided with projections as shown at 25 and notches between the same so that when they are turned there is produced an oscillation of their pawls and a resulting slight movement of the bolt which will effectually prevent a detection by the sense of touch of that position of said pawls in which the bolt may be operated.

I claim:—

1. A combination lock consisting of a relatively fixed structure; a rotatable member to be locked extending through said structure; a bolt longitudinally movable in the fixed structure to one side of the axis of rotation of said member and positioned to extend into and lock the same; a series of outwardly projecting pawls carried in a slot of said bolt; with a series of flanged rings mounted with their flanges in positions to normally prevent longitudinal movement of the pawls with the bolt, said flanges having openings respectively in positions to permit passage of the pawls and movement of the bolt when the rings occupy predetermined positions.

2. A combination lock consisting of a fixed structure having a cylindrical portion; a member to be locked rotatable concentrically with said fixed portion; a bolt slidably guided to one side of the axis of rotation of said member and movable into and out of engagement with said member; a series of rings rotatably mounted on said fixed structure and each having a slotted flange; with pawls carried by the bolt and normally held by said rings from movement while being free to move when the slots of the ring flanges occupy predetermined positions.

3. The combination of a fixed structure having a cylindrical portion; a steering post extending through said fixed portion; a steering wheel on said post; a bolt slidable in the fixed structure into and out of engagement with the steering wheel; a series of pawls carried by the bolt; with a series of rings rotatably mounted on the fixed structure so as to extend around the post and normally preventing movement of the pawls and the bolt, but formed to permit such movement when in predetermined positions.

4. The combination of a fixed structure having a cylindrical portion; a bolt movable longitudinally of said fixed portion in a line parallel with the center line thereof; a series of outwardly acting spring pawls carried by the bolt; a rotatable structure having a portion placed to be engaged by the bolt so as to be held from movement; with a series of inwardly flanged rings rotatable on the fixed structure and normally presenting their flanges to the pawls so as to prevent movement of the bolt while having openings respectively placed to permit passage of the pawls when in predetermined positions.

5. A combination lock consisting of a series of locking rings; a series of independent combination rings respectively mounted on said locking rings; spring actuated plungers for normally holding each combination ring in a definite position upon its locking ring; and means for locking each locking ring to its combination ring.

CHARLES WOLF.